United States Patent [19]
Chouings

[11] 3,752,266
[45] Aug. 14, 1973

[54] FLUID PRESSURE BRAKING SYSTEMS

[75] Inventor: Leslie Cyril Chouings, Leamington Spa, England

[73] Assignee: Automotive Products Company Limited, Warwichshire, England

[22] Filed: Jan. 13, 1971

[21] Appl. No.: 106,147

[52] U.S. Cl.............................. 188/170, 188/106 P
[51] Int. Cl............................................ F16d 65/24
[58] Field of Search................ 188/106 P, 106 F, 188/170, 343

[56] References Cited
UNITED STATES PATENTS

| | | | |
|---|---|---|---|
| 3,513,946 | 5/1970 | Rick | 188/106 P |
| 3,463,276 | 8/1969 | Brooks | 188/106 P |
| 2,155,030 | 4/1939 | Wilkins | 188/106 P |
| 2,154,636 | 4/1939 | Nickell | 188/106 P |
| 2,418,666 | 4/1947 | Rockwell | 188/170 X |
| 3,417,843 | 12/1968 | Trollope | 188/170 |
| 2,064,575 | 12/1936 | Taylor | 188/343 X |

Primary Examiner—Evon C. Blunk
Assistant Examiner—Merle F. Maffei
Attorney—Lawrence J. Winter

[57] ABSTRACT

A vehicle braking system comprising internal shoe drum brakes of the two-leading shoe type for each wheel. Each front brake is operated by two wheel cylinders. Each rear brake is operated by a wheel cylinder at one end of the brake shoes and by a wedge-type mechanical expander at the other end. A first liquid accumulator is connected through a pedal operated valve to the wheel brake wheel cylinders and to one of the wheel cylinders of each front brake. A second liquid accumulator is connected through the pedal operated valve to the other front brake wheel cylinders and through a manually operable valve also to motor cylinders for the expanders. A third liquid accumulator is connected through the manually operable valve to said motor cylinders. The piston of each motor cylinder is urged in the brake applying direction by a spring acting through a plunger. Normally liquid pressure from the third accumulator acts on the plungers in opposition to the springs so that, for service braking, the expanders are operated by liquid supplied by operation of the pedal operated valve. For parking purposes, the manually operable valve is operated to cut off the supply of liquid from the third accumulator so that the expanders act to apply the rear brakes either due to the action of the spring, or due to the action of liquid pressure supplied by the pedal operated valve which liquid pressure is directed also by the manually operable valve to act on the plunger in opposition to the spring.

5 Claims, 3 Drawing Figures

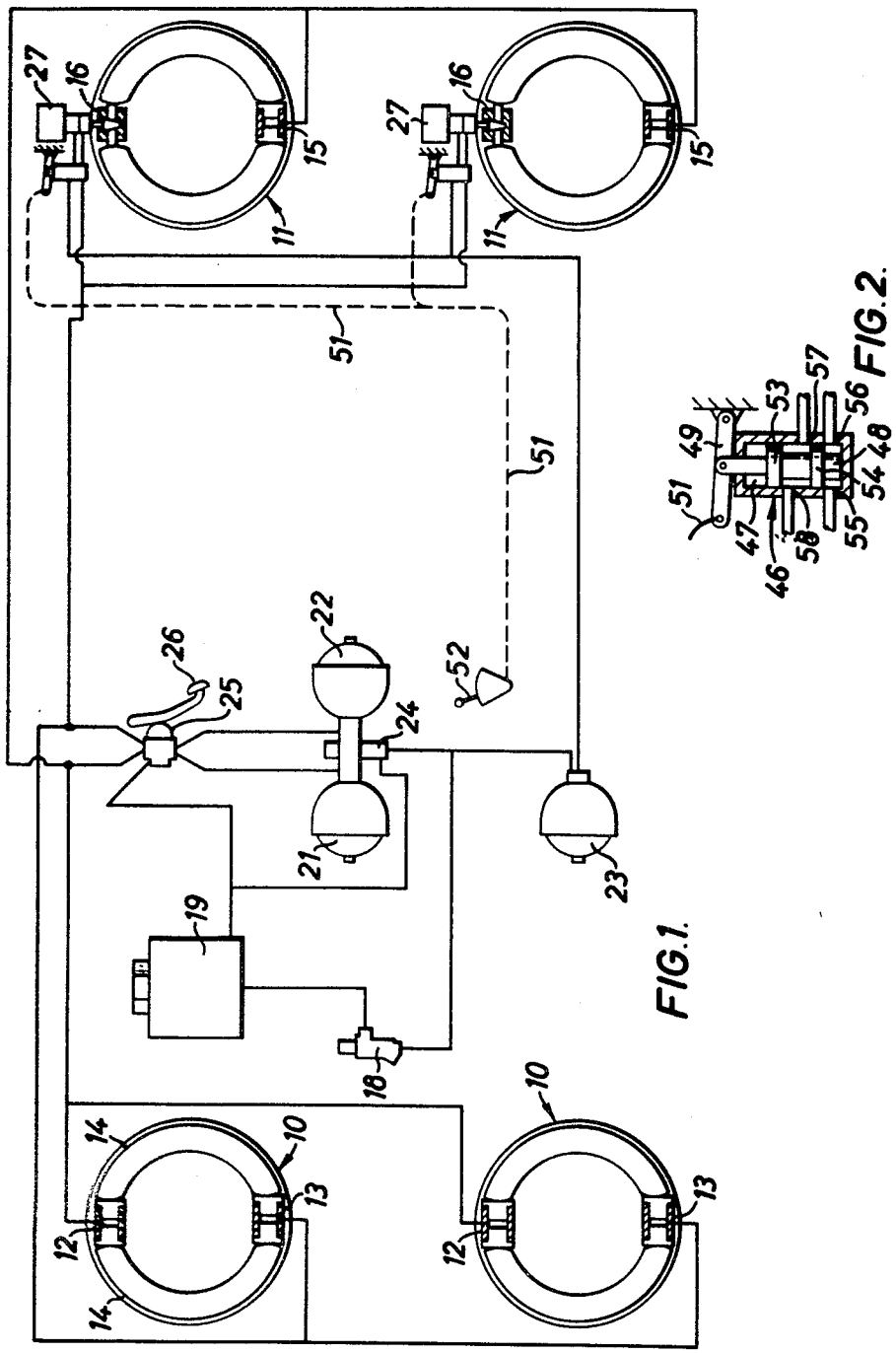

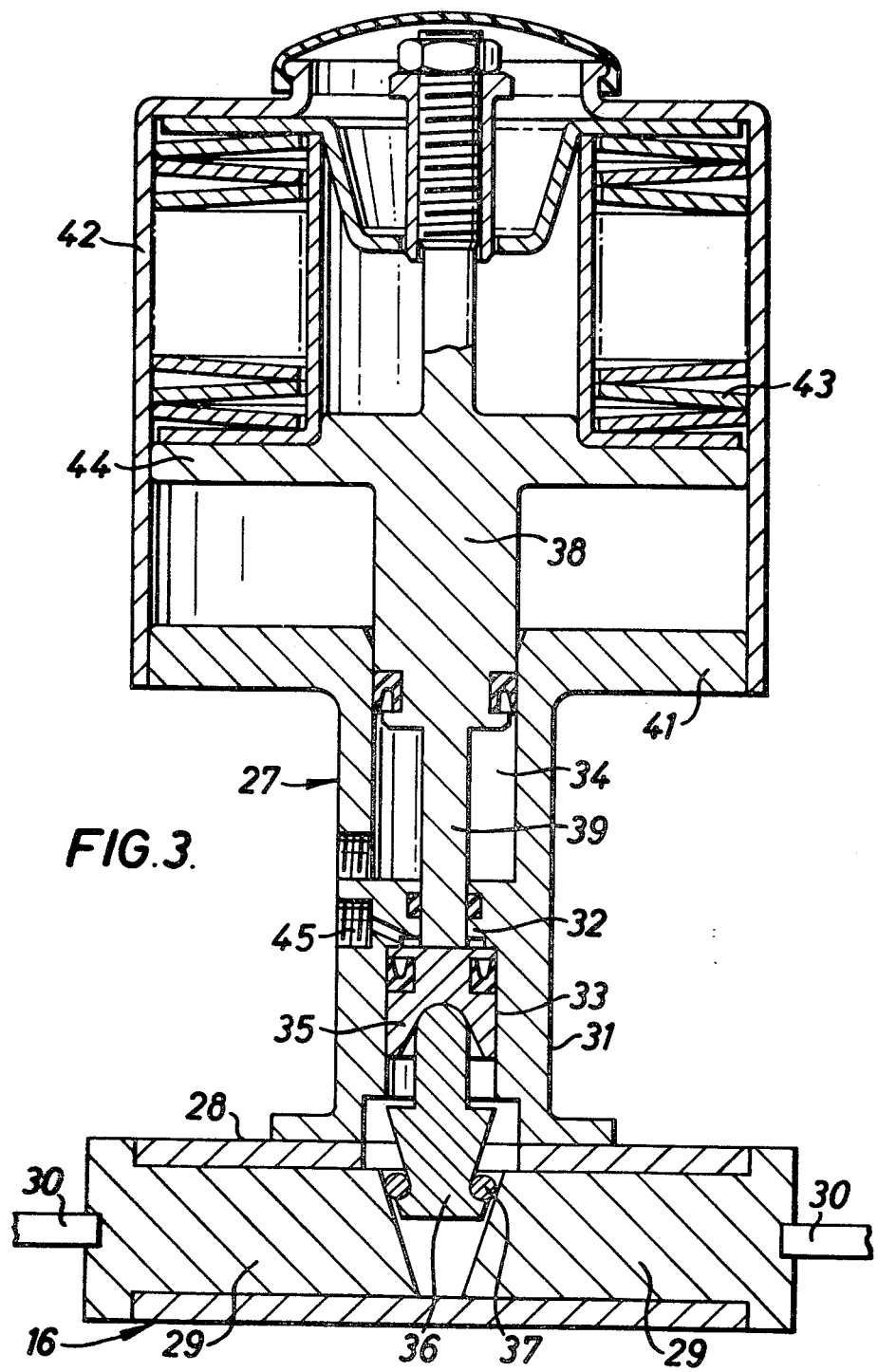

FLUID PRESSURE BRAKING SYSTEMS

This invention relates to fluid pressure braking systems for vehicles of the kind in which brakes on at least one wheel or pair of wheels of the velhicle are of the two leading shoe type and the shoes of each brake are applied to the associated brake drum by two fluid pressure operated expanding devices one acting between one pair of ends of the brake shoes and the other acting between the other pair of ends of tha said shoes, the two expanding devices being operated respectively, by fluid pressure in two separate fluid pressure systems.

If the said brakes are to be used for parking purposes as well as for stopping and controlling the speed of the vehicle, provision must be made for holding the brakes in the applied condition by means other than the fluid pressure. Such provision may be made by using mechanical shoe expanding devices operated by fluid pressure both for service braking and for parking, and arranging for them to be locked by mechanical means in the brake applying condition when the brakes are applied for parking, but to ensure that the brakes are properly held applied for parking when they are already in the applied condition due to operation of the service brake operating system, it is necessary to provide, in each brake, for each shoe expander, both applying means for parking and locking means.

It is the object of the present invention to provide, in a fluid pressure braking system of the kind referred to, a simpler and more economical means of holding the brakes applied for parking purposes.

According to the invention, there is provided a fluid pressure braking system for a vehicle including brakes of the two-leading shoe type on at least one wheel or pair of wheels of the vehicle, the shoes of each said brake being applied to the associated brake drum by two fluid pressure operated expanding devices one acting between one pair of ends of the brake shoes and the other acting between the other pair of ends of the brake shoes, the two expanding devices being operated respectively by fluid pressure in two separate fluid pressure systems, wherein the shoe expanding device acting between said one pair of ends of the brake shoes is operable only by fluid pressure in one of the fluid pressure systems and the shoe expanding device acting between the said other pair of ends of the brake shoes includes mechanical expanding means operable both by fluid pressure in the other of said fluid pressure systems and by spring means, additional fluid pressure means being provided which normally act in opposition to said spring means to prevent said spring means from acting to apply the brake, said additional fluid pressure means being rendered inoperative when the brake is to be applied for parking.

A valve operated by a parking control member may be arranged to release fluid pressure from said additional fluid pressure means only when pressure is also relieved in both of the fluid pressure systems.

Preferably, the mechanical expanding means are operated by a piston assembly including a first piston on which fluid pressure in said other fluid pressure system acts to operate the expanding means and a second piston on which the spring means acts to operate the expanding means, the additional fluid pressure means including said second piston and means for applying fluid pressure to said second piston to oppose the spring.

One embodiment of the invention will now be described by way of example, with reference to the accompanying drawings, in which:

FIG. 1 is a diagram of the braking system;

FIG. 2 is a sectional elevation of a valve controlling the application of the brakes for parking purposes; and FIG. 3 is a sectional elevation showing the operating means for providing both fluid pressure and mechanical actuation of the mechanical expanding device.

Referring to FIG. 1, the braking system includes internal shoe drum brakes 10 of the two-leading shoe type acting on the front wheels of a vehicle and internal shoe drum brakes 11 of the same type acting on the rear wheels of the vehicle, the front brakes 10 being operated each by two wheel cylinders 12 and 13 the pistons of which act directly on the brake shoes 14, the wheel cylinders 12 and 13 being arranged one between each pair of adjacent ends of the brake shoes. The rear wheel brakes 11 are operated each by one wheel cylinder 15 similar to the front wheel cylinders 12 and 13 and by one wedge-type mechanical expander 16 actuated by fluid pressure and also actuable by spring means as will be hereinafter described. The wheel cylinders 12, 13 and 15 are of the type having two pistons movable outwardly in opposite directions by fluid pressure acting in the wheel cylinders, inward movement of the pistons being limited by shoulders thereon abutting the ends of the wheel cylinders. The mechanical expanders 16 each comprise a wedge member acting between two plungers slidable in a fixed housing, the wedge member being free to float in the direction of sliding movement of the plungers and the housing providing abutments to support the shoes against circumferential movement due to drum drag when the brake is applied.

A pump 18, preferably driven by the engine of the vehicle, draws liquid from a reservoir 19 and supplies it to three liquid pressure accumulators 21, 22 and 23, an unloader valve 24 being provided to return the pump output to the reservoir when the accumulators are fully loaded.

The acumulators 21 and 22 provide sources of liquid pressure for two separate fluid pressure systems A and B of which the system A includes the wheel cylinder 12 of each front wheel brake 10 and the wheel cylinders 15 of the rear brakes 11, whilst the system B includes the other wheel cylinder 13 of each front brake 10 and the liquid pressure motor cylinders actuating both wedge-type expanders 16 of the rear wheel brakes 11.

The two fluid pressure systems include control valves housed in a common unit 25 and arranged for simultaneous operation by, for example a pedal 26, the said valves normally connecting the wheel cylinders and motor cylinders to the reservoir 19, but connecting them to the accumulators 21 and 22 when the pedal is depressed. The pedal 26 and valve unit 25 thus control service braking, i.e. braking for stopping or controlling the speed of the vehicle.

Each mechanical expander 16 has associated with it an operating unit 27, one operating unit 27 and its associated expander 16 beinG shown in cross section in FIG. 3. The expander 16 has a tubular body 28, open at both ends, in which the plungers for applying thrust to the shoes are slidable, the plungers being shown at 29 and the ends of the webs of the shoes at 30. The operating unit 27 has a tubular body 31 extendinG at right angles to the expander body 28 and divided by a transverse partition 32 to define a cylinder space 33 of relatively smaller diameter adjacent the actuator body 28 and a cylinder space 34 of relatively larger diameter at its opposite end. A piston 35 slidable in the cylinder space 33 acts on a floating wedge member 36 acting between inclined end surfaces on the plungers 29, rollers 37 being provided between the wedge and the plungers 29. A second piston 38, slidable in the cylinder space 34, has a stem 39 extending through an aperture in the partition 32 to engage the piston 35, a sealing ring being provided in the aperture in the partition through which the stem 39 passes to prevent leakage of fluid between the two cylinder spaces.

An external flange 41 on the end of the body 31 remote from the actuator defines one end of a spring housing 42 in which spring means, shown as a stack of Belleville washers 43, act on a flange 44 on the second piston 38, to apply a thrust, through the pistons 38 and 35 to the wedge member 36 to urge the plungers 29 outwardly.

The cylinder spaces 33 and pistons 35 constitute the liquid pressure motor cylinders for actuating the wedge-type expanders, connections to the said cylinders being provided at 45 to receive conduits leading from the valve unit 25.

The cylinder spaces 34 are connected, through manually controlled valves 46, which will be hereinafter described with reference to FIG. 2, to the third liquid pressure accumulator 23, liquid pressure in the spaces 34 acting in opposition to the springs 43 to relieve the wedge members 36 of the load of the said springs.

The manually controlled valves 46, one of which is shown in section in FIG. 2, are mounted each adjacent to one of the operating units 27, each said valve 46 comprising a body defining a bore 47 in which is slidable a valve plunger 48 movable in the bore by a lever 49 connected by a cable 51 to a hand control lever 52. The valve plunger 48 is formed with two axially spaced lands 53 and 54 and four ports 55, 56, 57 and 58 are provided in the wall of the bore 47.

The ports 55 and 56, which are directly opposite one to the other, are connected respectivley to the control valve unit 25 and to the cylinder space 33 of the associated operating unit 27, the arrangement being such that when the control valve unit is in its normal position the port 55 is connected to the reservoir, and when the said control valve unit is operated to apply the brakes the said port is connected to the liquid pressure accumulator 22. The ports 57 and 58 are offset from each other longitudinally of the valve bore 47, the port 57, which is connected to the cylinder space 34 of the associated operating unit 27, being positioned axially between the ports 55, 56 and the port 58, which latter port is connected to the liquid pressure accumulator 23.

In the normal position of the valve plunger 48, which it occupies at all times except when the brakes are applied for parking purposes, and in which position it is shown in FIG. 2, the land 54 lies between the ports 55, 56 and the port 57, and the land 53 lies on the opposite side of the port 58 to the port 57, so that the cylinder space 34 is connected to the accumulator 23 and isolated from the cylinder space 33 and the control valve unit 25. Liquid pressure from the accumulator 23 therefore acts in the cylinder spaces 34 of both operating units 27 to support the load of the springs 43 and prevent that load from being applied to the wedge members 36 to apply the rear brakes. To apply the brakes for parking purposes, the valve plunger 48 is moved upwardly from the position shown in FIG. 2 until the land 54 lies between the two ports 57 and 58, thus isolating the cylinder space 34 from the accumulator 23 and connecting it, in common with the cylinder space 33, to the control valve unit 25. If the said control valve unit is in its normal position, in which it connects the cylinder spaces 33 to the reservoir the cylinder spaces 34 are also connected immediately to the reservoir and the springs 43 come into action immediately to apply the rear brakes, but if the control valve unit is in the position to apply the brakes, liquid pressure from the accumulator 22 acts in the cylinder spaces 34 as well as in the cylinder spaces 33 and the springs 43 remain inoperative until the valve unit 25 is moved to the brake released position, but come into operation as soon as the valve unit 25 is moved to the brake released position, moving the wedge members 36 to take up any shoe movement resulting from release of liquid from the wheel cylinders 15.

For service braking, all of the brake assemblies act as two leading shoe brakes in both direction of rotation of the wheels each brake shoe being moved outwardly at its leading end being urged by the drum drag against an abutment at its trailing end. For parking purposes, the rear brakes act in the manner of leading-and-trailing shoe brakes, the shoes being both urged outwardly at one pair of adjacent ends and being supported against effectively fixed abutments at their other pair of adjacent ends.

In the embodiment of the invention specifically described, the braking system employs a liquid as the working fluid, but the invention may be applied to systems in which the working fluid is air.

Whilst the invention has been described as applied to a four-wheeled vehicle it could be applied to a vehicle having any number of wheels the brakes on any chosen one or ones of which could be arranged to be operated for parking purposes.

I claim:

1. A fluid pressure braking system for a vehicle including, on at least one wheel of the vehicle, an internal shoe drum brake having a drum and two brake shoes, two fluid pressure operated expanding devices for applying the shoes of said brake to said brake drum, one said expanding device acting between one pair of ends of said brake shoes and the other expanding device acting between the other pair of adjacent ends oF said brake shoes, and two separate fluid pressure systems each for operating a respective one of said two expanding devices, means for operating both said fluid pressure systems simultaneously to apply said brake as a two leading shoe brake, said one expanding device comprising members actuated by fluid pressure in one said fluid pressure system to apply the brake shoes to the drum and the said other expanding device including mechanical expanding means to apply the brake shoes to the drum, spring means operative to exert a force on said mechanical applying means to apply the brake shoes to the drum, a first piston associated with said mechanical expanding means in which fluid pressure in the other of said fluid pressure systems acts to actuate said mechanical expanding means, a second piston associated with said spring means, valve means for controlling the application of fluid pressure to said second piston and normally connecting said piston to a source of fluid pressure so that said fluid pressure acts on said second piston to prevent said spring means from applying the brake, said valve means being operative to release the fluid pressure acting in said second piston to allow the brake to be applied for parking by the spring.

2. A fluid pressure braking system according to claim 1, wherein a valve operated by a parking control member is arranged to release fluid pressure from said additional fluid pressure means only when pressure is also relieved in both of the fluid pressure systems.

3. A fluid pressure braking system according to claim 1 wherein the mechanical expanding means are operated by a piston assembly including a first piston on which fluid pressure in said other fluid pressure system acts to operate the expanding means and a second piston on which the spring means acts to operate the expanding means, the additional fluid pressure means including said second piston and means for applying fluid pressure to said second piston to oppose the spring.

4. A fluid pressure braking system accordig to claim 3 wherein a valve operated by a parking control member is arranged to release fluid pressure from said additional fluid pressure means only when pressure is also relieved in both of the fluid pressure systems, and including a manually operable valve for controlling the additional fluid pressure means, said manually operated valve being operable to connect a cylinder, in which fluid pressure acts on said second piston, selectivley to a source of fluid pressure independent of both of said fluid pressure systems and to the said other one of said fluid pressure systems so that fluid pressure acting therein is controlled in common with fluid pressure operating the shoe expanding means operated by fluid pressure in that system.

5. A fluid pressure braking system according to claim 1, wherein the fluid employed in the system is a liquid.

* * * * *